US007217303B2

(12) United States Patent
Hershkowitz et al.

(10) Patent No.: US 7,217,303 B2
(45) Date of Patent: May 15, 2007

(54) PRESSURE SWING REFORMING FOR FUEL CELL SYSTEMS

(75) Inventors: Frank Hershkowitz, Liberty Corner, NJ (US); Paul J. Berlowitz, Glen Gardner, NJ (US); Randall D. Partridge, Califon, NJ (US)

(73) Assignee: ExxonMobil Research and Engineering Company, Allandale, NJ (US)

( * ) Notice: Subject to any disclaimer, the term of this patent is extended or adjusted under 35 U.S.C. 154(b) by 688 days.

(21) Appl. No.: 10/756,647

(22) Filed: Jan. 13, 2004

(65) Prior Publication Data

US 2004/0175326 A1   Sep. 9, 2004

Related U.S. Application Data

(60) Provisional application No. 60/450,904, filed on Feb. 28, 2003.

(51) Int. Cl.
*C01B 3/36* (2006.01)
*C01B 3/46* (2006.01)

(52) U.S. Cl. .................. 48/197 R; 48/214; 48/94; 48/196; 48/206; 48/198; 429/17; 429/18; 429/19; 429/20; 429/26; 423/230; 423/244; 423/650; 423/651; 423/652; 423/653; 423/654; 208/63; 208/64; 208/65

(58) Field of Classification Search .............. 48/197 R, 48/214, 196, 94, 206, 198; 429/17–20, 26; 423/230, 244, 650–654; 208/63–65
See application file for complete search history.

(56) References Cited

U.S. PATENT DOCUMENTS

| 1,726,877 | A | 10/1929 | Battig | |
| 2,313,157 | A | 3/1943 | Linder | ................ 252/373 |
| 2,556,835 | A | 6/1951 | Barr | .................. 48/196 |
| 3,429,678 | A | 2/1969 | Milbourne et al. | ........ 48/196 |
| 4,200,682 | A | 4/1980 | Sederquist | ............. 429/17 |
| 4,240,805 | A | 12/1980 | Sederquist | ............. 48/214 |
| 4,293,315 | A | 10/1981 | Sederquist | ............. 48/94 |
| 4,642,272 | A | 2/1987 | Sederquist | ............. 429/17 |

(Continued)

FOREIGN PATENT DOCUMENTS

EP    0219163 A2   4/1987

(Continued)

OTHER PUBLICATIONS

"Conversion Catalytique et Cyclique Des Hydrocarbures Liquides et Gazeaux," Societe ONIA-GEGI 4, place des Etats-Unis 92 Montrouge, pp. 1-32.

*Primary Examiner*—Glenn Caldarola
*Assistant Examiner*—Vinit H. Patel
(74) *Attorney, Agent, or Firm*—Paul E. Purwin

(57) ABSTRACT

The present invention provides an improvement in the process of producing hydrogen from hydrocarbon-containing streams. A cyclic reforming process, referred to as pressure swing reforming, provides an efficient means for producing a hydrogen containing synthesis gas for fuel cell applications. Pressure swing reforming may be integrated with shift reactions, preferential oxidation, and membrane separation, achieving thermal and material efficiencies relative to conventional hydrogen production. In one embodiment, at least some synthesis gas which is first produced in the pressure swing reforming process is combusted with air to provide the heat for the regeneration step of the pressure swing reforming process.

33 Claims, 5 Drawing Sheets

U.S. PATENT DOCUMENTS

| | | |
|---|---|---|
| 4,751,055 A | 6/1988 | Jubin, Jr. .................... 422/190 |
| 4,816,353 A | 3/1989 | Wertheim et al. ............. 429/19 |
| 5,492,649 A | 2/1996 | Christensen ................ 252/372 |
| 5,980,596 A | 11/1999 | Hershkowitz et al. ..... 48/127.9 |
| 5,985,178 A | 11/1999 | Long et al. ................. 252/373 |
| 6,103,143 A | 8/2000 | Sircar et al. ................ 252/373 |
| 6,113,874 A | 9/2000 | Kobayashi .................. 423/650 |
| 6,210,157 B1 | 4/2001 | Kobayashi .................. 432/181 |
| 6,302,188 B1 | 10/2001 | Ruhl et al. .................... 165/10 |
| 6,767,530 B2 | 7/2004 | Kobayashi et al. ......... 423/650 |
| 2003/0113257 A1 | 6/2003 | Kobayashi et al. ......... 423/652 |

FOREIGN PATENT DOCUMENTS

| | | |
|---|---|---|
| GB | 1365744 | 9/1974 |
| GB | 1421767 | 1/1976 |
| GB | 2265380 A | 9/1993 |
| GB | 2265382 | 9/1993 |
| GB | 2265481 A | 9/1993 |
| SE | 148275 | 7/1919 |
| WO | 2004/000725 A1 | 12/2003 |

Reforming Step

Regeneration Step

Purwin PEP-0203 Figure 2.
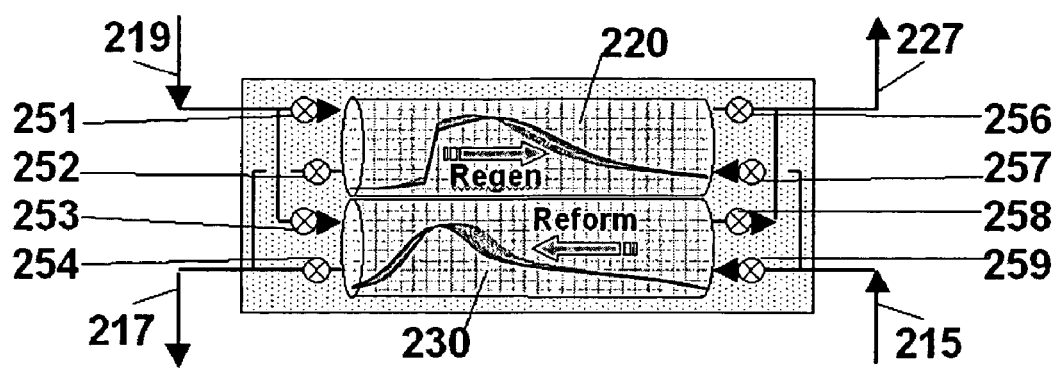

PRESSURE SWING REFORMING FOR FUEL CELL SYSTEMS

This application claims the benefit of U.S. Provisional Application No. 60/450,904 filed Feb. 28, 2003.

FIELD OF THE INVENTION

The present invention relates to process improvements in the production of hydrogen from hydrocarbons. More particularly, the invention relates to a process scheme wherein synthesis gas is produced in a cyclic reforming process in which the reforming step of the synthesis gas production is performed at pressures greater than or equal to the regeneration step. The hydrogen stream may be used as a source of hydrogen fuel in applications such as fuel cells. The present invention provides an efficient process for producing a hydrogen fuel from hydrocarbons, particularly useful for confined space applications such as "on board" vehicle applications (e.g. passenger vehicles, trucks, buses or the like) for fuel cell powered vehicles.

BACKGROUND OF THE INVENTION

Conventional synthesis gas generating processes include steam reforming, gas phase partial oxidation and autothermal reforming. Each of these processes has advantages and disadvantages when compared to each other.

In a steam reforming process, steam is reacted with a hydrocarbon containing feed to produce a hydrogen-rich synthesis gas. The general stoichiometry, as illustrated for methane, is:

$$CH_4 + H_2O \rightarrow CO + 3H_2 \quad (1)$$

Typically, an excess of steam is used to drive the equilibrium to the right. As applied to hydrogen manufacture, excess steam also serves to increase the water gas shift reaction:

$$CO + H_2O \rightarrow CO_2 + H_2 \quad (2)$$

Because of the high endothermicity of the reaction, steam reforming is typically carried out in large furnaces, in which a reforming catalyst is packed into tubes. The tubes must withstand the high pressure of the produced synthesis gas, while transmitting heat at temperatures approaching 1000° C. As described in Stanford Research Institute International Report No. 212 (1994), steam reforming process efficiency, (defined as the heat of combustion of product hydrogen divided by the heat of combustion of reforming feed and furnace fuel), is approximately 74%, while the space velocity, (defined as Standard Cubic Feet per Hour of $C_1$-equivalent feed/ft$^3$ of catalyst bed) is 1000 hr$^{-1}$. Unfortunately, steam reforming furnaces occupy a very large volume of space, substantially greater than the tube volume. This feature, and the relatively low efficiency, combine to severely limit its utility in point-of-use fuel applications such as fuel cells and would likely be unfeasible for on-board vehicle applications.

Gas phase partial oxidation involves the partial oxidation of the hydrocarbon containing feed in the gas phase. The feed components are introduced at a burner where they combust with sub-stoichiometric oxygen to produce a synthesis gas mixture. The ideal gas phase partial oxidation reaction, as illustrated for methane, is:

$$CH_4 + \tfrac{1}{2}O_2 \rightarrow CO + 2H_2 \quad (3)$$

However, gas-phase reaction kinetics tend to over-oxidize some of the feed, resulting in excessive heat generation and substantial yield of $H_2O$, $CO_2$, and unreacted hydrocarbons as soot.

For these reasons, when gas phase partial oxidation chemistry is applied to clean feeds, it is preferred to add steam to the feed and add a bed of steam reforming catalyst to the gas phase partial oxidation reactor vessel. This combination of gas phase partial oxidation and steam reforming is called autothermal reforming. A fully catalytic version of autothermal reforming, typically using platinum or rhodium to catalyze the oxidation, is known in the art. However, autothermal reforming requires a source of oxygen. In the fuel cell vehicle applications, this oxygen is typically provided as compressed air, which results in a nitrogen-diluted synthesis gas that adversely effects the operating efficiency of the fuel supply/fuel cell and adds the cost and complexity of an additional compressor.

Sederquist (U.S. Pat. Nos. 4,200,682, 4,240,805, 4,293,315, 4,642,272 and 4,816,353) teaches a steam reforming process in which the heat of reforming is provided within the bed by cycling between combustion and reforming stages of a cycle. As described by Sederquist, the high quality of heat recovery within the reforming bed results in a theoretical efficiency of about 97%. However, these patents describe a process that operates at very low productivity, with space velocities of around 100 hr$^{-1}$ (as $C_1$-equivalent). Moreover, this process requires a compressor to compress the product synthesis gas to elevated pressure. One consequence of Sederquist's low space velocity is that resulting high heat losses impede the ability of this technology to achieve the theoretical high efficiency.

The inventors here have discovered a highly efficient and highly productive process for producing hydrogen from a hydrocarbon containing fuel. This process is a cyclic, two step process referred to herein as "pressure swing reforming" or "PSR". The reforming step involves introducing a hydrocarbon-containing feed, along with steam. The feed may also include $CO_2$, and, optionally, other process gases. The feed is introduced to the inlet of the first zone containing reforming catalyst. During the reforming step a temperature gradient across the reforming catalyst has a peak temperature that ranges from about 700° C. to 2000° C. Upon introduction of the reactants, the hydrocarbon is reformed into synthesis gas over a catalyst in this first zone. This reforming step of the cycle may be performed at a relatively high pressure. The synthesis gas is then passed from the first zone to a second zone, where the gas is cooled to a temperature close to the inlet temperature of the regeneration-step feed by transferring its heat to packing material in the recuperation zone.

The regeneration step begins when a gas is introduced to the inlet of the second zone. This gas is heated by the stored heat of the packing material of the recuperation zone. Additionally, an oxygen-containing gas and fuel are combusted near the interface of the two zones, producing a hot flue gas that travels across the first zone, thus re-heating that zone to a temperature high enough to reform the feed. This second part of the cycle is performed at a relatively low pressure. Once heat regeneration is completed, the cycle is completed and reforming begins again.

The PSR process produces a relatively high pressure, hydrogen-containing synthesis gas that may be used to fuel a fuel cell. The PSR process may be integrated with synthesis gas adjustment processes where the fuel cell fuel purity requirements dictate. In one embodiment the PSR process is integrated with a water gas shift reaction and a preferential oxidation ("PROX") reaction to convert CO to $CO_2$. In an alternate embodiment, a membrane separation means is substituted for, or supplements, the CO conversion reactions. The membrane functions to separate hydrogen from other synthesis gas components (i.e. CO, $CO_2$ and any residual hydrocarbon containing gases). In an alternate embodiment, a pressure swing adsorption step is substituted for the membrane separation step to remove the other synthesis gas components from hydrogen.

The present invention is advantageous in efficiency and in producing relatively high partial pressures of hydrogen fuel when compared to air-blown auto thermal reforming. The present invention is advantageous in efficiency, compactness, hydrocarbon conversion, and reactor cost when compared with other steam reforming approaches. When used in a fuel cell application, the high spatial velocities are advantageous to the efficiency of the fuel supply/fuel cells system.

SUMMARY OF INVENTION

The present invention provides an improvement in the process of producing hydrogen from hydrocarbon-containing streams. A cyclic reforming process, referred to as pressure swing reforming, provides an efficient means for producing a hydrogen containing synthesis gas for fuel cell applications. Pressure swing reforming may be integrated with shift reactions, preferential oxidation, and membrane separation, achieving thermal and material efficiencies relative to conventional hydrogen production. In one embodiment, at least some synthesis gas which is first produced in the pressure swing reforming process is combusted with air to provide the heat for the regeneration step of the pressure swing reforming process. Alternate embodiments employing pressure swing reforming are detailed hereinafter.

The process of pressure swing reforming, detailed hereinafter, is generally described as (a) introducing a feed stream comprising a hydrocarbon and steam at a space velocity greater than about 500 $hr^{-1}$ through a first end of a first zone containing bed packing materials and a steam reforming catalyst that are heated to a reforming temperature to produce a synthesis gas stream containing $H_2$, CO and $CO_2$.

(b) passing at least a portion of the product of step (a) to a second zone containing bed packing materials via the first end of 2nd zone, and transferring the heat from the synthesis gas stream to the packing materials;

(c) removing substantially all of the product from said second zone via the second end of 2nd zone;

(d) introducing an oxygen-containing gas into the second end of said second zone;

(e) contacting said oxygen-containing gas with a fuel and combusting said gas and fuel within said zones, thereby re-heating said first zone to reforming temperatures and creating a fluegas which exits through the first end of said first zone.

The pressure swing reforming process efficiently produces a hydrogen containing synthesis gas that may be used to fuel a fuel cell.

The embodiments of the invention are set forth in the detailed description hereinafter.

BRIEF DESCRIPTION OF DRAWINGS

FIG. 2 is a diagrammatic illustration of pressure swing reforming using a dual bed, valved system.

DETAILED DESCRIPTION

Figure 1A:
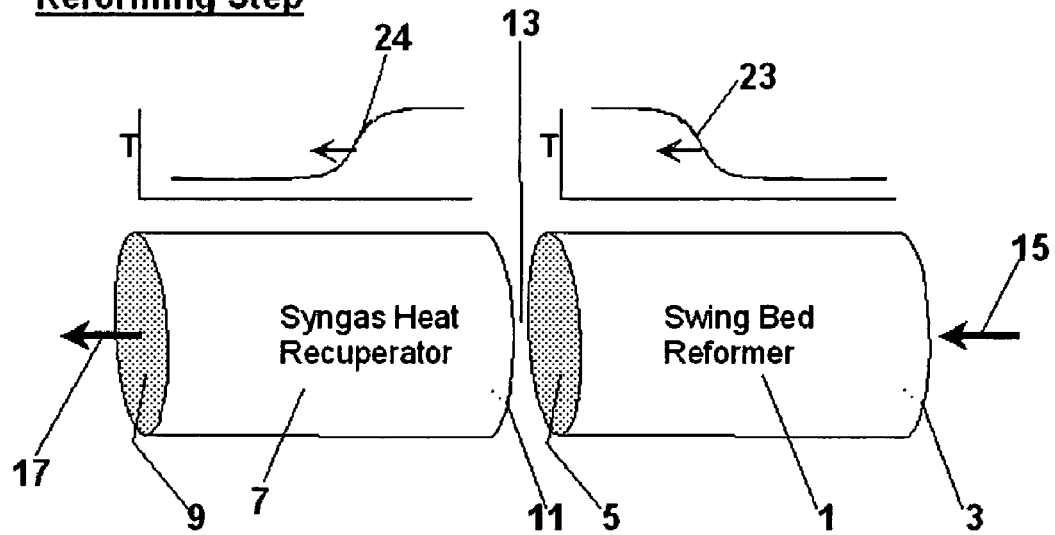
FIGS. 1a and 1b are diagrammatic illustrations of the reforming and regeneration steps of pressure swing reforming.
Figure 1B:
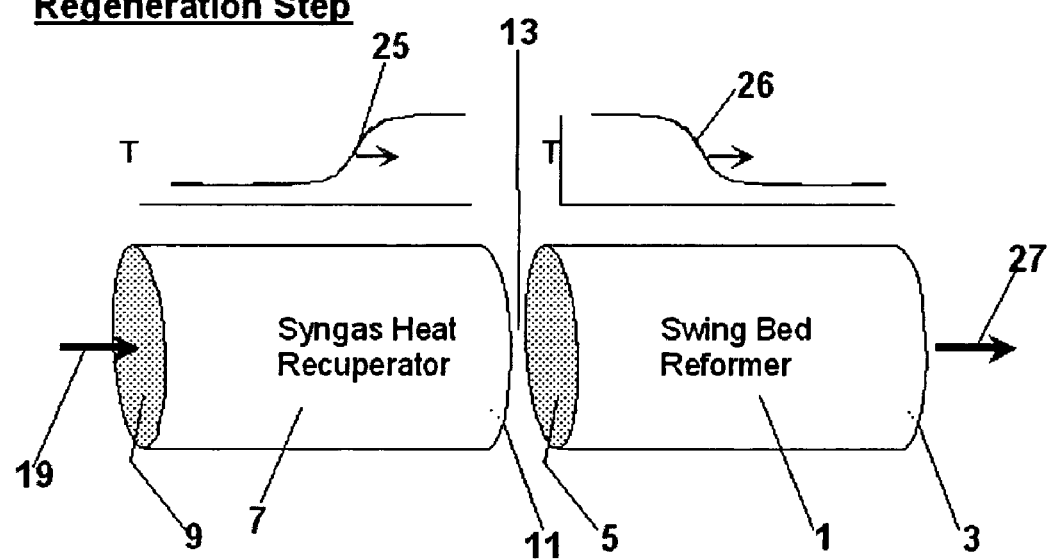

The basic two-step cycle of pressure swing reforming is depicted in FIG. 1. Referring now to FIGS. 1a and 1b, a first zone, or reforming zone (1), called a swing bed reformer, and a second zone, or recuperating zone, called a synthesis gas heat recuperator (7). The beds of both zones will include packing material, while the reforming bed (1) will include catalyst for steam reforming. Though illustrated as separate reforming and recuperating zones, it is to be recognized that the pressure swing reforming apparatus may comprise a single reactor.

As shown in FIG. 1a, at the beginning of the first step of the cycle, also called the reforming step, the reforming zone (1) is at an elevated temperature and the recuperating zone (7) is at a lower temperature than the reforming zone (1). A hydrocarbon-containing feed is introduced via a conduit (15), into a first end (3) of the reforming zone (1) along with steam. The hydrocarbon may be any material that undergoes the endothermic steam reforming reaction including methane, petroleum gases, petroleum distillates, kerosene, jet fuel, fuel oil, heating oil, diesel fuel and gas oil and gasoline. Preferably the hydrocarbon will be a gaseous material or one which will rapidly become substantially gaseous upon introduction into the reforming zone (1). Preferably, the steam will be present in proportion to the hydrocarbon in an amount that results in a steam to carbon ratio between about 1 and about 3 (considering only carbon in the hydrocarbon, not carbon in CO or $CO_2$ species that may be present).

This feed stream picks up heat from the bed and is converted over the catalyst and heat to synthesis gas. As this step proceeds, a temperature profile (23) is created based on the heat transfer properties of the system. When the bed is designed with adequate heat transfer capability, as described herein, this profile has a relatively sharp temperature gradient, which gradient will move across the reforming zone (1) as the step proceeds Synthesis gas exits the reforming bed (1) through a second end (5) at an elevated temperature and passes through the recuperating zone (7), entering through a first end (11) and exiting at a second end (9). The recuperating zone (7) is initially at a lower temperature than the reforming zone (1). As the synthesis gas passes through the recuperating zone (7), the synthesis gas is cooled to a temperature approaching the temperature of the zone substantially at the second end (9), which is approximately the same temperature as the regeneration feed introduced during the second step of the cycle via conduit (19) (e.g. from about 20° C. to about 600° C.). As the synthesis gas is cooled in the recuperating zone (7), a temperature gradient (24) is created and moves across the recuperating zone (7) during this step.

At the point between steps, the temperature gradients have moved substantially across the reforming zone (1) and the recuperating zone (7). The zones are sized so that the gradients move across both in comparable time during the above reforming step. The recuperating zone (7) is now at the high temperature and the reforming zone (1) is at low temperature, except for the temperature gradient that exists near the exits of the respective zones. The temperature of the reforming zone (1) near the inlet end (3) has now been cooled to a temperature that approaches the temperature of the hydrocarbon feed that has been entering via conduit (15) (e.g. from about 20° C. to about 600° C.).

In the practice of pressure swing reforming, there are alternative means for determining the end of the reforming step. Toward the end of the reforming step, the temperature at end (5) of the reforming zone is reduced and consequently the reforming performance deteriorates below acceptable conversion efficiencies. Reforming performance, as used herein, refers to the conversion of feed hydrocarbons into synthesis gas components of $H_2$, CO and $CO_2$. The term percent conversion, as used herein, is calculated as the percent conversion of the carbon in feed hydrocarbonaceous species into synthesis gas species of CO and $CO_2$. The term unconverted product hydrocarbons, as used herein, refers to product hydrocarbonaceous species that are not synthesis gas components of $H_2$, CO and $CO_2$. These typically include product methane, as well as feed hydrocarbons and the cracking products of feed hydrocarbons. The reforming step ends when the reforming performance deteriorates to a level that is below acceptable limits. In practice, optimization of the overall reforming and synthesis gas utilization process will dictate a desired, time-averaged level of reforming conversion. That time-averaged level of reforming conversion is typically greater than 80%, preferably greater than 90%, and most preferably greater than 95%.

The point in time at which the reforming step is ended, and thus the duration of the reforming step, may be chosen (a) as a response to the time-varying performance of the reformer during each reforming step; or (b) based on overall (time-averaged) performance or the system; or (c) fixed as a constant reforming step duration. In embodiment (a), at least one feature of the operation is monitored that is correlated to the reforming performance. This feature may be a composition such as $CH_4$, $H_2$, or CO, or alternatively a temperature, such as the temperature at the end (5) of the reforming bed. In one embodiment of the present invention, the reforming step is ended when the temperature at the end (5) of the reforming has decreased to a pre-selected temperature between about 700° C. and about 1200° C. In embodiment (b), the reforming step duration is adjusted based on a measured feature that reflects the overall (time-averaged) performance or the system. This may be an average product composition such as $CH_4$, $H_2$, or CO. In one embodiment the present invention, the reforming step duration is adjusted based on the time-averaged concentration of $CH_4$ in the product, using control strategies known in the art to shorten or lengthen the duration to achieve a predetermined target $CH_4$ amount. In a preferred embodiment, the target $CH_4$ amount is set at an amount that represents between about 1% and about 15% of the hydrocarbonaceous feed carbon. In case (c), the reforming step duration is of fixed length, at a value that is predetermined to be acceptable for the space velocity of the operation. In one embodiment the present invention, the reforming step duration is fixed at a duration between about 0.1 sec and less than about 60 seconds and preferably between about 1.0 and 30 seconds.

After the synthesis gas is collected via an exit conduit (17) at the second end (9) of the recuperating zone (7), the second step of the cycle, also called the regeneration step begins. The regeneration step, illustrated in FIG. 1b, basically involves transferring the heat from the recuperator bed (7) to the reformer bed (1). In so doing, the temperature gradients 25 and 26 move across the beds similar to but in opposite directions to gradients 23 and 24 during reforming. In a preferred embodiment, an oxygen-containing gas and fuel are introduced via a conduit (19) into the second end (9) of the recuperating zone (7). This mixture flows across the recuperating zone (7) and combusts substantially at the interface (13) of the two zones (1) and (7). In the present invention, the combustion occurs at a region proximate to the interface (13) of the recuperation zone (7) and the reforming zone (1). The term, "region proximate", in the present invention, means the region of the PSR beds in which regeneration step combustion will achieve the following two objectives: (a) the heating of the reforming zone such that end (5) of the reforming zone is at a temperature of at least 800° C., and preferably at least 1000° C. at the end of the regeneration step; and (b) the cooling of the recuperation zone to a sufficient degree that it can perform its function of accepting synthesis gas sensible heat in the subsequent reforming step. Depending on specific regeneration embodiments described herein, the region proximate to the interface can include from 0% to about 50% of the volume of the recuperation zone (7), and can include from 0% to about 50% of the volume of the reforming zone (1). In a preferred embodiment of the present invention, greater than 90% of the regeneration step combustion occurs in a region proximate to the interface, the volume of which region includes less than about 20% the volume of the recuperating zone (7) and less than about 20% the volume of reforming zone (1).

The location of combustion may be fixed by introduction of one of the combustion components, e.g., the fuel, at or substantially at, the interface of the two zones (13), while the other component, e.g., the oxygen-containing gas may be introduced at the first end (9) of the recuperating zone (7). Alternatively, the fuel and oxygen-containing gas (19) streams may be mixed at the open-end (9) of the recuperating zone (7) and travel through the zone and combust at the interface of the zones (13). In this embodiment, the location of combustion is controlled by a combination of temperature, time, fluid dynamics and catalysis. Fuel and oxygen conventionally require a temperature-dependent autoignition time to combust. In one embodiment, the flow of a non-combusting mixture in a first substep of regeneration will set the temperature profile in the recuperating zone (7) such that the zone is not hot enough to ignite until the mixture reaches the interface of the zones.

The presence of catalyst in the reforming zone can also be used to initiate combustion at that location, and a space between the reforming and recuperating zones can be added and designed to further stabilize the combustion process and confine the combustion to the area proximate to the above described interface. In yet another embodiment, the location of combustion is fixed by mechanical design of the recuperating zone. In this design, the fuel and oxygen-containing gas are travelling in separate channels (not shown), which prevent combustion until the feeds combine at the interface of the zones (13). At that location, flame holders (not shown) or a catalyst in the reforming zone will ensure that the combustion occurs.

The combustion of the fuel and oxygen-containing gas creates a hot fluegas that heats the reforming zone (1) as the flue gas travels across that zone. The fluegas then exits through the first end of the reforming zone (3) via a conduit (27). The composition of the oxygen-containing gas/fuel mixture is adjusted to provide the desired temperature of the reforming zone. The composition and hence temperature is adjusted by means of the proportion of combustible to non-combustible portions of the mixture. For example, non-combustible gases such as $H_2O$, $CO_2$, and $N_2$ can be added to the mixture to reduce combustion temperature. In a preferred embodiment, non-combustible gases are obtained by use of steam, flue gas, or oxygen-depleted air as one component of the mixture. When the hot fluegas reaches the temperature gradient within the reformer, the gradient moves further across the bed. The outlet temperature of the fluegas will be substantially equal to the temperature of the reforming zone (1) near the inlet end (3). At the beginning of the regeneration step, this outlet temperature will be substantially equal to the inlet temperature of the reforming feed of the preceding, reforming, step. As the regeneration step proceeds, this outlet temperature will increase slowly and then rapidly as the temperature gradient reaches end (3), and can be 50–500° C. above the temperature of the reforming feed by the end of the step.

In the practice of pressure swing reforming, there are alternative means for determining the end of the regeneration step. The regeneration step ends when sufficient heat has been supplied or conveyed to the reforming bed to enable the carrying out of the reforming step. The point in time at which the regeneration step is ended, and thus the duration of the regeneration step, may be chosen (a) as a response to the time-varying performance of the PSR during each regeneration step; or (b) based on overall (time-averaged) performance or the system; or (c) fixed as a constant regeneration step duration. In embodiment (a), some feature of the operation is monitored that is related to the regeneration performance. This feature could be a composition such as $O_2$, $CH_4$, $H_2$, or CO, or could be a temperature such as the temperature at the end (3) of the reforming bed. In one embodiment of the present invention, the regeneration step is ended when the temperature at the end (3) of the reforming bed has increased to a pre-selected temperature between about 200° C. and about 800° C. In embodiment (b), the regeneration step duration is adjusted based on a measured feature that reflects the overall (time-averaged) performance of the system. This feature may be an average product composition such as $CH_4$, $H_2$, or CO, or some other system measurement. In one embodiment of the present invention, the regeneration step duration is adjusted based on the time-averaged concentration of $CH_4$ in the product, using control strategies known in the art to shorten or lengthen the duration to achieve the target $CH_4$ amount. In a preferred embodiment, the target $CH_4$ amount is set at an amount that represents between about 1% and about 15% of the hydrocarbonaceous feed carbon. In embodiment (c), the regeneration step duration is of fixed length, at a value that is predetermined to be acceptable for the space velocity of the operation. In one embodiment the present invention, the regeneration step duration is fixed at a duration between about 0.1 second and about 60 seconds and preferably 1.0–30 seconds. In all of these cases, but particularly in embodiment (c), it is preferable to also adjust the regeneration flow rates to increase or decrease the amount of heat added to the bed during the step—in a manner similar to that described with respect to adjustment of duration in embodiment (b), above. In a further embodiment of the present invention, the regeneration step duration is fixed at a duration between about 1 second and about 60 seconds, and the regeneration flow rate is adjusted over time so that the time-average concentration of CH4 in the reforming product approaches a target $CH_4$ amount that is set at an amount that represents between about 1% and about 15% of the hydrocarbonaceous feed carbon The reforming zone is now, once again, at reforming temperatures suitable for catalytic reforming.

For fuel cell applications, it is particularly advantageous to produce hydrogen feed streams having relatively high hydrogen partial pressure, and at relatively high space velocities. In pressure swing reforming the two steps of the cycle may be conducted at different pressures, that is, the reforming step may be carried out at higher pressures than the regeneration step. The reforming step pressures range from about zero (0) atmospheres (gauge pressure) to about twenty-five (25) atmospheres (gauge pressure). The term gauge pressure is intended to reflect pressure above atmospheric pressure at the location of operations (e.g. at elevations above sea level, atmospheric pressure may be <101 kPa). Regeneration step pressures range from about zero atmospheres (gauge pressure) to about ten (10) atmospheres (gauge pressure). Unless otherwise stated, pressures are identified in units of gauge pressure. The pressure swing is enabled in principle part to the large volumetric heat capacity difference between the solid bed packing material and the gases.

The space velocity of a system is typically expressed on an hourly basis as the standard volumetric gas flow rate of feed divided by the volume of catalyst bed, called gaseous hourly space velocity, or GHSV. Space velocity can also be defined in terms of the hydrocarbon component of feed. As so defined, the GHSV for a methane feed would be the standard hourly volumetric gas flow rate of methane divided by the bed volume. As used herein, the term space velocity, abbreviated as $C_1GHSV$, refers to the space velocity of any hydrocarbon feed placed on a $C_1$ basis. As such, the hydrocarbon feed rate is calculated as a molar rate of carbon feed, and standard volume rate calculated as if carbon is a gaseous species. For example, a gasoline feed having an average carbon number of 7.0 that is flowing at a gaseous flow rate of 1,000 NL/hr into a 1.0L bed would be said to have a space velocity of 7,000. This definition is based on feed flow during the reforming step and wherein the bed volume includes all catalysts and heat transfer solids in the reforming and recuperating zones.

In pressure swing reforming, the space velocity, $C_1GSHSV$, typically ranges from about 500 to about 150,000, preferably from about 1,000 to about 100,000, and most preferably from about 2,000 to about 50,000.

In a preferred embodiment pressure swing reforming is conducted under bed packing and space velocity conditions that provide adequate heat transfer rates, as characterized by a heat transfer parameter, $\Delta T_{HT}$, of between about 0.1° C. to about 500° C., and more preferably between about 0.5° C. and 40° C. The parameter $\Delta T_{HT}$ is the ratio of the bed-average volumetric heat transfer rate that is needed for reforming, H, to the volumetric heat transfer coefficient of the bed, $h_v$. The volumetric heat transfer rate that is needed for reforming is calculated as the product of the space velocity with the heat of reforming (on heat per $C_1$ volume basis). For example, H=4.9 cal/cc/s=2.2 cal/cc*8000 $hr^{-1}$/ 3600 s/hr, where 2.2 cal/cc is the heat of reforming of methane per standard volume of methane, and 8000 is the $C_1GHSV$ of methane. When the duration of reform and regeneration steps are comparable, the value of H will be comparable in the two steps. The volumetric heat transfer coefficient of the bed, $h_v$, is known in the art, and is typically calculated as the product of a area-based coefficient (e.g. $cal/cm^2 s° C.$) and a specific surface area for heat transfer ($a_v$, e.g. $cm^2/cm^3$), often referred to as the wetted area of the packing.

For PSR, reforming step feed temperatures range from about 20° C. to about 600° C., and preferably from about 150° C. to about 450° C. Regeneration feed temperatures are substantially similar, ranging from about 20° C. to about 600° C. and preferably from about 150° C. to about 450° C. Different embodiments for the integration of the PSR with a fuel cell and optional synthesis gas modification and/or separation processes, detailed hereinafter, will have different most-preferred temperatures for PSR feeds. The temporal isolation of the reforming step from the regeneration step provides the opportunity to operate these steps at substantially different pressures, in a way that is advantageous to the PSR/Fuel Cell system. Thus, reforming step pressures for PSR as taught herein range from about zero (0) atmosphere to about twenty five (25) atmospheres, and preferably from about four (4) atmospheres to about fifteen (15) atmospheres. Regeneration step pressures range from about zero atmosphere to about ten (10) atmospheres, and preferably from about zero (0) atmosphere to about four (4) atmospheres. Unless otherwise stated, pressure is expressed in units of gauge pressure.

FIG. 2 shows an embodiment of the pressure swing reforming diagrammatically illustrating the cyclic reforming and regeneration process. In this embodiment, two pressure swing reforming bed systems are used simultaneously such that one system is reforming while the other is regenerating. The use of multiple beds can provide a continuous flow of reformed product notwithstanding the cyclical operation of each bed. In FIG. 2, a first bed (220) is engaged in the step of regeneration, while a second bed (230) is engaged in the step of reforming. Each bed (220 and 230) includes both reforming and recuperating zones. In this embodiment, several sets of valves are used to control the various streams flowing to and from the beds. A first set of valves (257 and 259) controls the flow of hydrocarbon feed and steam feed to the beds, while a second set of valves (252 and 254) control the flow of the product of the reforming step exiting the recuperating zones. The third set of valves (251 and 253) regulate the flow of oxygen-containing gas/fuel and optional non-combusting gas to the beds and the fourth set of valves (256 and 258) control the flow of fluegas exiting the reforming zone.

In operation, when valves 251, 254, 256, and 259 are open, valves 252, 253, 257 and 258 are closed. With these valve states, oxygen containing gas and fuel (219) enter the bed (220) through valve 251 while fluegas (227) exits the bed (220) through valve 256. Concurrently, the hydrocarbon and steam feed (215) enters the second bed (230) through valve 259 while the product of reforming (217) exits this bed (230) through valve 254. At the conclusion of this step, valves 252, 253, 257 and 259 now open and valves 251, 254, 256 and 257 now close, and the cycle reverses, with the first bed (220) reforming the feed and the second bed (230) regenerating the heat.

The heat transfer characteristics of the bed packing material are set to enable the high space velocity.

It is well known in the art that bed packing can be characterized for heat transfer coefficient (h) and characterized for heat transfer surface area (often referred to as wetted area, $a_v$). Correlations for these parameters, based on gas and solid properties, are well known. The product of these two parameters is the bed's heat transfer coefficient on a bed volume basis:

Volumetric heat transfer coefficient:

$$h_v = \frac{BTU}{(ft^3 \, Bed)(°F.)(s)} \quad or \quad = \frac{kcal}{(L \, Bed)(°C.)(s)}$$

The heat transfer coefficients are sensitive to a variety of gas properties, including flow rate and composition. Coefficients are typically higher during reforming because the hydrogen in the gas has very high thermal conductivity. Coefficients are typically increased by decreasing the characteristic size of the packing (e.g., hence ⅛" beads will have higher $h_v$ than ½" beads).

The heat of reforming of hydrocarbons is well known, and can be expressed on a basis of units of heat per standard volume of hydrocarbon gas. The heat transfer requirement for this PSR system can be expressed as the product of volumetric heat of reforming with the GHSV of the feed. Volumetric heat transfer requirements of the system are expressed as:

$$H = \frac{GHSV \cdot \Delta H_{REF}}{3600 \, s/hr} = \frac{BTU}{(ft^3 \, Bed)(s)} \quad or \quad = \frac{kcal}{(L \, Bed)(s)}$$

In this equation, GHSV and $\Delta H_{REF}$ have substantially identical units of feed amount. Thus, if the units of GHSV are as NL/hr of $C_1$ per L bed, then the units of $\Delta H_{REF}$ are heat of reaction per NL of $C_1$.

A heat transfer delta-temperature $\Delta T_{HT}$, is also used herein to characterize the PSR system, as taught herein. $\Delta T_{HT}$ is defined herein as the ratio of volumetric heat transfer requirement to volumetric heat transfer coefficient.

Characteristic heat transfer $\Delta T_{HT} = H/h_v$.

This characteristic $\Delta T_{HT}$ describes the balance between heat transfer supply and demand. As used herein, the $\Delta T_{HT}$ is calculated using heat transfer coefficients based on typical regeneration conditions. The characteristic $\Delta T_{HT}$ is a basic design parameter for the present invention. Packing or space velocity are chosen to satisfy characteristic $\Delta T_{HT}$ requirements of this invention.

In the practice of this embodiment, the characteristic $\Delta T_{HT}$ should be between about 0.1° C. and about 500° C. More preferably, the characteristic $\Delta T$ should be between about 0.5° C. and 40° C.

As an example, if a packing has a heat transfer coefficient of 10 BTU/ft³s° F., then given a methane heat of reforming of 248 BTU/scf the $C_1$GHSV achievable at a characteristic $\Delta T_{HT}$ of 40° C., would be ~1.5×10⁴ hr⁻¹. Given bed-packing materials that are presently known in the art, including particulate packing, and foam and honeycomb monoliths, the present invention can be operated at high efficiency at a space velocity up to about 100,000 hr⁻¹.

In a preferred embodiment the bed packing material will have several characteristics. It will have the ability to cycle repeatedly between high (e.g. ≧1000° C.) and low (e.g. ≦600° C.) temperatures, provide high wetted area (e.g. ≧6 cm⁻¹) and volumetric heat transfer coefficient (e.g. ≧0.02 cal/cm³s° C., preferably ≧0.05 cal/cm³·° C., and most preferably ≧0.10 cal/cm³s° C.), have low resistance to flow (i.e., low pressure-drop), have operating temperature consistent with the highest temperatures encountered during regeneration, and have high resistance to thermal shock. Furthermore, it is preferred that the material has high bulk heat capacity (e.g. $\geqq 0.10$ cal/cm$^3 \cdot °$ C. and preferably $\geqq 0.20$ cal/cm$^3 \cdot °$ C.). Additionally, the bed packing material will provide sufficient support for the reforming catalyst in the reforming bed. These requirements are met via control of the shape, size, and composition of the bed packing materials.

The shape and size of the bed packing material impact the beds heat transfer capability and flow resistance. This is because packing shape and size impact how the fluid flows through the packing, including, most importantly, the size and turbulence in the fluid boundary layers that are the primary resistance to heat, mass and momentum transfer between fluid and solid. Furthermore, the size of the materials also impacts thermal shock resistance of the bed, because larger structures are typically susceptible to thermal shock. The shape impacts bed heat capacity through its relationship on bed void volume. The design of advantageous packing shapes to achieve these aspects of the invention is well know in the art.

Examples of suitable packing materials include honeycomb monoliths and wall-flow monoliths, which have straight channels to minimize pressure drop and enable greater reactor length. Preferred honeycomb monoliths for the present invention will have channel densities that range from about 100 channels/in$^2$ to about 3200 channels/in$^2$ (15–500 channels/cm$^2$). In an alternate embodiment more tortuous packing, such as foam monoliths and packed beds may be employed. Preferred foam monoliths for the present invention will have pore densities that range from about 10 ppi (pores per inch) to about 100 ppi (i.e. 4–40 pore/cm). Preferred packed beds for the present invention will have packing with wetted surface area that range from about 180 ft$^{-1}$ to about 3000 ft$^{-1}$ (i.e. 6–100 cm$^{-1}$).

The composition of the bed packing material is important to operating temperature and thermal shock resistance. Thermal shock resistance is generally greatest for materials having low coefficients of thermal expansion, because it is the temperature-induced change in size that stresses a component when temperatures are changing due to cycling. Ceramic materials have been developed that are resistant to combustion temperatures and thermal shock, particularly for application in engine exhaust filters and regenerative thermal oxidizers. Cordierite materials (magnesium aluminum silicates) are preferred for their very low coefficients of thermal expansion. Preferred materials of construction include aluminum silicate clays, such as kaolin, aluminum silicate clay mixed with alumina, or aluminum silicate clay and alumina mixed with silica and optionally zeolites. Other candidate materials of construction include mullite, alumina, silica-alumina, zirconia, and generally any inorganic oxide materials or other materials stable to at least 1000° C. The materials may be used alone or in combination, and may have their structures stabilized, for example by use of rare earth additives. The bed packing materials of the regenerating zone can either be the same or different from the packing materials of the reforming zone.

The configuration of the beds within the reforming and recuperating zones may take the many forms that are known in the art. Acceptable configurations include horizontal beds, vertical beds, radial beds, and co-annular beds. Packing may be monolithic or particulate in design. Particulate packing may become fluidized during some steps of the present invention. In a preferred embodiment, bed packing is maintained in a fixed arrangement.

Suitable reforming catalysts include noble, transition, and Group VIII components, as well as Ag, Ce, Cu, La, Mo, Mg, Sn, Ti, Y, and Zn, or combinations thereof, as well as other metal and non-metal materials added to stabilize and/or enhance catalytic performance. As used herein above, the term component relates to a metal or metal oxide thereof. Preferred catalyst systems include Ni, NiO, Rh, Pt, and combinations thereof. These materials may be deposited or coated on, or in, catalyst supports well known in the art.

Figure 3:
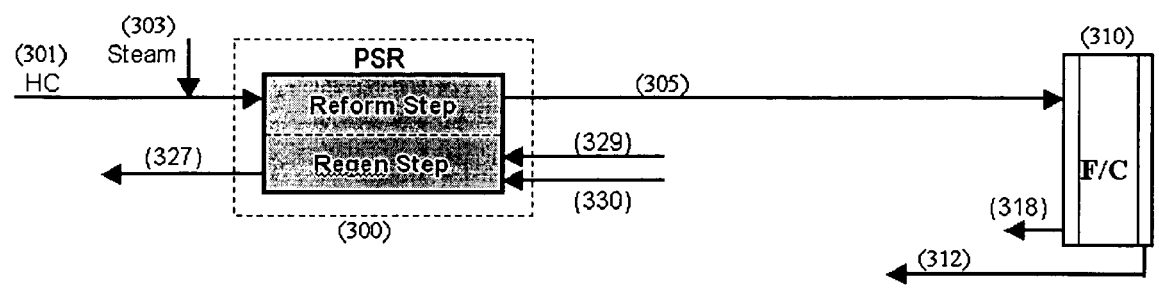
FIG. 3 is a diagrammatic illustration of a process design using pressure swing reforming for a fuel cell application.

FIG. 3 diagrammatically illustrates the pressure swing reforming process described above to supply hydrogen fuel to a fuel cell. The PSR unit (300) may include single or multiple beds, with the details of valving and flow control all contained within the unit (300), and not further detailed in FIG. 3. Referring to the figure, a hydrocarbon containing feed (301) such as gasoline, and steam (303) are supplied to the reforming step of the PSR reactor (300), where the feed gases are converted to a synthesis gas (305) using the pressure swing reforming process previously described. The synthesis gas generally comprises CO, CO$_2$, H$_2$, H$_2$O and residual hydrocarbon gases. The synthesis gas produced by PSR is at a relatively high pressure, typically ranging from about zero (0) atmospheres gauge to about twenty five (25) atmospheres, and preferably from about four (4) atmospheres to about fifteen (15) atmospheres.

There are several different types of fuel cells known in the art, and each imposes different restrictions on the fuel properties. The synthesis gas from the PSR reactor may be used as the fuel for a fuel cell, or may be subject to additional processes that may be needed to adjust the effluent composition to those of the fuel cell input. For example, a low temperature Polymer Electrolyte Fuel Cell (PEFC), common in vehicle applications, requires a hydrogen stream that contains very small concentrations of CO (typically <100 ppm), but may contain large concentrations of inert gases such as nitrogen and CO$_2$. The CO content of the PSR effluent would be reduced through either chemical conversion—for example, by water-gas shift—or through separation for such fuel cell application. A high-temperature solid-oxide fuel cell ("SOFC"), would not require these processes, and the PSR effluent could be used without further modification directly in the cell. Other fuel cells that may be used with PSR include alkaline fuel cells, molten carbonate fuel cells, and phosphoric acid fuel cells.

The embodiment illustrated in FIG. 3 employs a fuel cell (310) that is tolerant of PSR-produced synthesis gas components that accompany the hydrogen produced (such as CO, for example), and may utilize the synthesis gas (305) as produced by the PSR reactor (300). Although not illustrated in the figure, alternatively, a synthesis gas adjustment step (not shown) may be integrated to convert one or more of the synthesis gases to gases used or tolerated by fuel cell (310). For example, one or more water gas shift reaction steps, known in the art, may be used to convert carbon monoxide in the synthesis gas into carbon dioxide, which is more tolerable to conventional fuel cells. Additionally, a preferential oxidation process step may be used to reduce CO levels by oxidation to CO$_2$. Suitably preferential oxidation processes are also known in the art.

The regeneration step of the PSR, as described previously, is accomplished using an oxygen-containing stream (330) and a fuel stream (329), and producing a fluegas stream (327). Operation of the fuel cell results in exhaust of O$_2$-depleted air (312) from the cathode and H$_2$-depleted syngas (318) from the anode.

Figure 4:
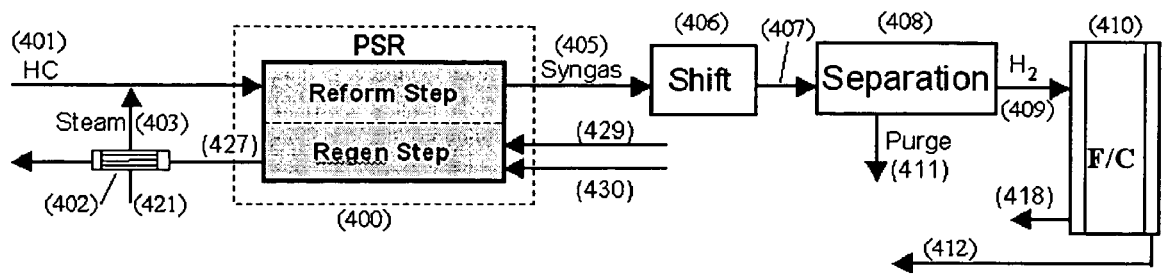
FIG. 4 is a diagrammatic illustration of a process design using pressure swing reforming with a shift reaction and hydrogen separation for a fuel cell application.

FIG. 4 illustrates the pressure swing reforming process described previously with a water-gas shift reaction followed by hydrogen separation. Referring to the figure, a hydrocarbon containing feed (401) and steam (403) are supplied to the reforming step of the PSR reactor (400), where the feed gases are converted to synthesis gas (405)

generally comprising CO, $CO_2$, $H_2$, $H_2O$ and residual hydrocarbon gases. In one embodiment the synthesis gas is optionally fed to a shift reactor (406) where CO levels are reduced by conversion to $CO_2$ and additional hydrogen is produced. An excess amount of steam may be provided to the PSR reforming step to satisfy steam requirements for the water-gas shift reaction. Alternatively, steam may be supplied to the water-gas shift reaction to promote the reaction illustrated in formula 2. The shift reaction is a process well known in the art, and as previously noted, may be conducted in one or more steps. For example, a single stage shift reaction may be conducted at temperatures of about 250° C. to about 400 C. in the presence of a shift catalyst, such as iron oxide-chromium oxide catalyst for example. Notably, the shift reaction does not substantially alter the pressure of the synthesis gas produced by PSR.

The synthesis gas 405, or optionally the shift reaction product (407) is fed to a hydrogen separator (408), which may comprise alternative hydrogen separation means. In one embodiment, the hydrogen separation means comprises a membrane configured to withstand the temperatures and pressures exhibited by the process gas stream, while having a relatively high permeance to hydrogen and low permeance to synthesis gas components other than hydrogen. The separator results in a hydrogen concentrate (409) that is fed to the fuel cell (410) and a purge stream (411). Alternative separation technologies may be used for separating hydrogen from the other constituents of the synthesis gas. Membrane separation, pressure and temperature swing adsorption, and absorption systems provide suitable hydrogen separation and are generally known in the art. In fuel cell applications, membrane separation systems and pressure swing adsorption systems are preferred. In one preferred embodiment, the hydrogen separator (408) is a membrane system comprising a metallic membrane such as palladium or vanadium.

Alternative membrane embodiments are known to those skilled in the art, and generally comprise inorganic membranes, polymer membranes, carbon membranes, metallic membranes, composite membranes having more than one selective layer, and multi-layer systems employing non-selective supports with selective layer(s). Inorganic membranes may be comprised of zeolites, preferably small pore zeolites, microporous zeolite-analogs such as AlPO's and SAPO's, clays, exfoliated clays, silicas and doped silicas. Inorganic membranes are typically employed at higher temperatures (e.g. >150° C.) to minimize water adsorption. Polymeric membranes typically achieve hydrogen selective molecular sieving via control of polymer free volume, and thus are more typically effective at lower temperatures (e.g. <200° C.). Polymeric membranes may be comprised, for example, of rubbers, epoxys, polysulfones, polyimides, and other materials, and may include crosslinks and matrix fillers of non-permeable. (e.g. dense clay) and permeable (e.g. zeolites) varieties to modify polymer properties. Carbon membranes are generally microporous and substantially graphitic layers of carbon prepared by pyrolysis of polymer membranes or hydrocarbon layers. Carbon membranes may include carbonaceous or inorganic fillers, and are generally applicable at both low and high temperature. Metallic membranes are most commonly comprised of palladium, but other metals, such as tantalum, vanadium, zirconium, and niobium are known to have high and selective hydrogen permeance. Metallic membranes typically have a temperature- and $H_2$-pressure-dependent phase transformation that limits operation to either high or low temperature, but alloying (e.g. with Cu) is employed to control the extent and temperature of the transition. Most typically, metallic membranes are used between about 200° C. and about 500° C.

In preferred embodiments, the PSR process produces relatively high-pressure syngas that is particularly well suited to a membrane separation system. The rate of hydrogen permeation of the membrane is increased directly with hydrogen partial pressures. Accordingly, relatively high rates of permeation of hydrogen fuel (409) are accomplished through the use of PSR, resulting in increased hydrogen fuel (409) produced for use by fuel cell (410), and resulting in decreased amounts of hydrogen rejected in the separation's purge stream (411) with the non-hydrogen fraction of the synthesis gas.

The regeneration step of the PSR is fed with fuel (429) and oxygen-containing (430) streams, and results in a flue-gas stream (427). As detailed earlier, at least a part of fuel (429) is supplied from PSR generated synthesis gas. In a preferred embodiment, fuel (429) for the regeneration step is supplied by the separation purge (411), fuel cell anode exhaust (418), or a combination thereof. The flue gas stream (427) is at a temperature that is comparable to the temperature remaining in the reforming zone of the PSR at the end of the reforming step. In embodiments such as described in FIG. 4, in which the reforming feed $H_2O$ is introduced as steam, that reforming zone temperature is dictated by the kinetics of the steam reforming reaction. This is because, during the reforming step, reaction will consume heat until the temperature is too low for the kinetics, and then heat will no longer be consumed. Typically, this results in an average flue gas stream (427) temperature of about 400 to 500 C. In the embodiment shown in FIG. 4, the heat content of this fluegas stream is used to provide the enthalpy of vaporization for the water (421) that is used to make the reforming feed steam (403). A heat exchanger, also called a steam boiler (402), is used to transfer the heat of the fluegas into the $H_2O$ stream. In a preferred embodiment, a vapor recovery device (not shown) coupled to the cathode exhaust (412) of the fuel cell, supplies water to steam boiler (402).

In one embodiment of the present invention, at least part of the function of the steam boiler (402) is performed in-situ in the PSR reactor (400). In this embodiment, the $H_2O$ feed to the reforming step of PSR is fed, in part, as liquid water. When liquid water is fed to the reforming step, the enthalpy of vaporization of the water is obtained from the packing and catalyst in the reforming zone of the PSR reactor, such that the reforming zone will be cooled, over the course of the step, to a temperature approaching the boiling point of the water at reforming pressure (for example, 180° C. at 10 atm). The flue gas from the regeneration step of this embodiment will emerge at a temperature that is comparable to the temperature that it would have been cooled to if the flue gas enthalpy had been used to perform the vaporization in the external boiler (402). Typically, in this embodiment, the flue gas (427) will have a cycle-average temperature of about 150° C. to about 350° C.

Figure 5:
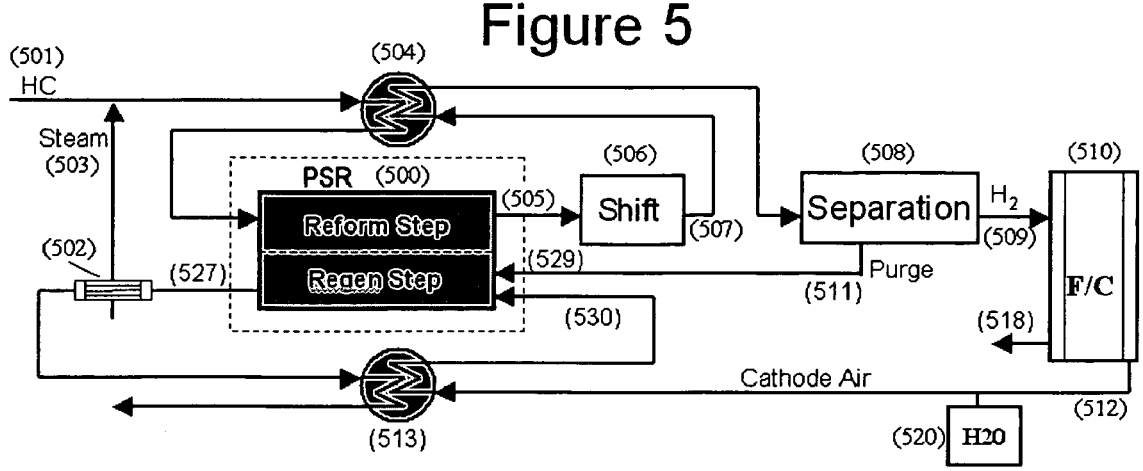
FIG. 5 is a diagrammatic illustration of a process design using pressure swing reforming, with a shift reaction and hydrogen separation for a fuel cell application having heat, fuel, and air integration.

Referring now to FIG. 5, there is shown, in diagrammatic form, a further embodiment of pressure swing reforming coupled with water gas shift reaction and hydrogen separation for supplying hydrogen fuel to a fuel cell. In this embodiment, the reforming, shift, separation and fuel cell utilize heat, fuel, and air integration to improve the efficiency of the overall process. Referring to FIG. 5, a hydrocarbon containing feed (501) and steam (503) is fed to the reforming step of PSR reactor (500). Pressure swing reforming, as detailed hereinabove, produces a relatively high-pressure synthesis gas (505). The synthesis gas generally comprises $H_2$, CO, $CO_2$, $H_2O$ and residual hydrocarbon gases. The synthesis gas then undergoes a water-gas shift reaction (506) producing a hydrogen enriched gas (507) having a temperature ranging from about 300° C. to abut 600° C. The gas stream (507) is passed through heat exchange means (504). The extracted heat is used to heat the hydrocarbon and steam feed to the PSR reactor. The cooled synthesis gas is then fed to hydrogen separation means (508) where gases other than hydrogen are substantially separated from the feed gas stream. In a preferred embodiment, hydrogen separation means 508 comprises a membrane that is permeable to hydrogen, but substantially less permeable to other synthesis gas components such as $CO_2$ and CO. As detailed above, effective membranes include inorganic, polymer, carbon, and metallic membranes for example. PSR produced synthesis gas is particularly advantageous in its preferred embodiment since it produces a relatively high pressure, high space velocity synthesis gas. This in turn increases the efficiency of the membrane, meaning that more hydrogen will permeate the membrane for use as the fuel cell fuel.

A fuel gas (509) comprising substantially hydrogen, is fed to the anode of fuel cell 510. The term substantially, as used with respect to the feed gas (509), means a hydrogen content of greater than about 90%. The feed gas is also characterized as having CO concentration less than about 1%, preferably less than 0.01%. Purge gases (511) from the hydrogen separation means (508) typically contain hydrocarbons, CO, $CO_2$, $H_2O$, and some fraction of the PSR-produced Hydrogen. The purge gases contain a substantial amount of heat of combustion. In the embodiment of FIG. 5, this stream is used as fuel (529) for the regeneration step of the PSR.

It is known in the art that separators present a tradeoff between separator size versus specifications of stream purity & recovery. The use of fuel in the regeneration step of the PSR utilizes un-recovered $H_2$ in the separator purge stream (511), which in turn reduces the recovery demands on the separator and enables a more compact separator size. This represents an advantage over ATR-based hydrogen generators.

A further integration is accomplished by using the fuel cell cathode exhaust (512) (typically ranging in oxygen content from about 4% to about 10%) as the oxygen-containing gas stream (530) used in the regeneration step of the PSR reactor (500). Heat exchange means (513) utilizes a high temperature flue gas (527) from the PSR reactor to heat the cathode exhaust (512), prior to its introduction into the PSR regeneration step.

The fuel cell cathode fluegas is typically moisture laden. In one embodiment of the present invention, a water recovery device (520) may be used to recover water from the cathode exhaust for use in meeting PSR and/or shift reaction steam requirements. In an alternate embodiment, the water recovery device (520) may be positioned on the PSR fluegas stream (527), after its passage through the heat exchange means (513).

As described in detail previously in reference to FIG. 4, the PSR fluegas stream (527) will typically be at a temperature of about 400° C. to about 500° C., and the steam feed to PSR (503) requires a source of heat for its vaporization from water. In a preferred embodiment the steam is vaporized using the heat of the PSR fluegas in steam boiler (502), before that fluegas is introduced into heat exchange means (513). In that case, the fluegas entering the heat exchange means (513) will have been cooled to a temperature of about 150° C. to about 250° C., and the heat exchange means (513) will heat the cathode effluent (512) to a temperature of about 100 to about 250° C. In an alternate embodiment, other waste heat stream is used to provide the heat of vaporization of the steam. For example, the fuel cell typically creates waste heat in an amount that is 20%–70% of the heat value of its feed hydrogen, an amount that is substantially greater than the heat of vaporization of the steam. When the steam is raised via a heat source that is not tied to the regeneration effluent, the PSR fluegas (527) entering heat exchange means (513) will be at a temperature of about 400 to about 500° C., and can heat the cathode effluent (512) to a temperature of about 300 to about 450° C.

Alternate embodiments of the present invention integrate heat by locating the heat exchange means (502, 504, 513) in different positions, to match the temperature requirements of the various system components. For example, in an embodiment in which the separation means is a polymer membrane system that is operated at a low temperature (50° C. to 150° C.), the steam (503) may be introduced to reforming feed after the heat exchange means (504), which lowers the temperature of the separation feed due to the lower temperature of the HC feed (501). In a further embodiment, if the separations means 508 operates at a high temperature (300° C.–500° C.) such as a palladium-based membrane, for example, then the heat exchanger means (504) could be applied to the separated hydrogen stream (509) instead of the shifted synthesis gas stream (507). In a further embodiment, excess heat in streams (505, 507, 509, 511) may be used in a heat exchanger means to assist in preheat or to vaporize additional water to make steam for the reforming step or to assist the vaporization of hydrocarbon feed. In other embodiments, the heat exchange and integration shown in FIGS. 4 and 5 can be applied to a flow-scheme such as FIG. 3 that does not use a shift reactor on the synthesis gas.

EXAMPLE 1

To illustrate one embodiment of the present invention, an amount of iso-octane was processed using the pressure swing reforming process illustrated in FIG. 4. The hydrogen separation means in this example is a supported palladium membrane, operating at a temperature of about 350° C. Key system parameters are identified in Table 1 below:

TABLE 1

| | Stream Identity | | | | | |
|---|---|---|---|---|---|---|
| | 401 + 403 Reform Feed | 407 Shift Outlet | 409 H2 Product | 411, 429 Recycle Purge | 430 Depleted Air | 427 Flue Gas |
| T, ° C. | 200 | 360 | 350 | 350 | 200 | 420 |
| P, Atm ga | 9 | 9 | 0 | 9 to 0.5 | 0.5 | 0 |
| gmol./min | | | | | | |
| IC8 | 1.70 | | | | | |
| $CH_4$ | | 0.408 | 0.00 | .408 | | |
| $H_2O$ | 20.406 | 3.01 | 0.00 | 1.33 | 12.15 | 20.04 |
| $H_2$ | 0.00 | 33.59 | 32.228 | 2.33 | 0.00 | 0.00 |
| CO | 0.00 | 7.32 | 0.00 | 7.32 | 0.00 | 0.00 |
| $CO_2$ | 0.00 | 5.875 | 0.00 | 5.87 | 0.00 | 10.30 |
| N2 | 0.00 | 0.07 | 0.00 | 0.00 | 79.96 | 79.96 |
| O2 | 0.00 | 0.00 | 0.00 | 0.00 | 5.65 | |
| ΔHc, kW | 143 | 178 | 126 | 49 | | |

This example utilizes two PSR reactors, operated as described with respect to FIG. 2 to provide a substantially continuous stream of product. The cycle time is about 15 seconds, with regeneration and reforming each operating about half the cycle. During the reforming step, the fuel flow is terminated about 0.25 sec before the steam, to allow remaining product to be flushed from the reactor into the product lines. The reactors are each about 6.3 inches (16 cm) long by 4.75 inches (12 cm) in diameter. The recuperator (uncatalysed) section of the bed is 1.5 inch (3.7 cm) long. Packing is a $\frac{1}{8}^{th}$ inch (3 mm) ring design resulting in a bed void fraction of about 0.5, a catalyst bed wetted area of about 480 ft$^{-1}$ (16 cm$^{-1}$), and a bulk bed heat capacity of about 0.27 cal/cc° C. The reforming $C_1$GHSV under these conditions is about 10,500 hr$^{-1}$, and the $\Delta T_{HT}$ is about 13° C. having a regeneration step $h_v$ of about 0.35 cal/cm$^3$s° C.).

EXAMPLE 2

To illustrate another embodiment of the present invention, an amount of methane was processed using the pressure swing reforming process illustrated in FIG. 5, but without the steam boiler (502). The hydrogen separation means in this example is a polymer membrane, operating at a temperature of about 100° C. Key system parameters are identified in Table 2 below:

TABLE 2

| | Stream Identity | | | | | |
|---|---|---|---|---|---|---|
| | 501 + 503 Reform Feed | 507 Shift Outlet | 509 H2 Product | 511 Recycle Purge | 530 Depleted Air | 527 Flue Gas |
| T, ° C. | 400 | 500 | 100 | 100 | 400 | 530 |
| P, Atm ga. | 9 | 9 | 1 | 9 to 0.5 | 0.5 | 0 |
| gmols/min | | | | | | |
| CH4 | 12.37 | 0.37 | 0 | 0.37 | | |
| H2O | 20.25 | 3.39 | 0 | 3.39 | 18.3 | 21.89 |
| H2 | 0 | 39.92 | 37.07 | 2.85 | | |
| CO | 0 | 8.21 | 0 | 8.21 | | |
| CO2 | 0 | 3.77 | 0 | 3.77 | | 12.35 |
| N2 | 0 | 0.07 | 0 | 0.07 | 93.4 | 93.4 |
| O2 | 0 | 0 | 0 | 0 | 6.26 | |
| ΔHc, kW | 160 | 199 | 145 | 54 | | |

This example makes use of two PSR reactors, operated as described with respect to FIG. 2 to provide a substantially continuous stream of product. The cycle time is 6 seconds, with regeneration and reforming each operating half the cycle. During the reforming step, the fuel flow is terminated about 0.1 sec before the steam, to allow remaining product to be flushed from the reactor into the product lines. The reactors are each 6.3 inches (16 cm) long by 3 inches (7.7 cm) in diameter. The recuperator (uncatalysed) section of the bed is 1.5 inch (3.7 cm) long. The packing is a 1200 channels/in$^2$ (186 channel/cm$^2$) honeycomb monolith design with 7 mil (0.18 mm) wall thickness, resulting in a bed void fraction of about 0.57, a bed wetted area of about 1260 ft$^{-1}$ (41 cm$^{-1}$), and a bulk bed heat capacity of about 0.22 cal/cm$^3$° C. The reforming $C_1$GHSV under these conditions is about 22,300 hr$^{-1}$, and the $\Delta T_{HT}$ is about 27° C., having regeneration step $h_v$ of about 0.52 cal/cm$^3$s° C.

EXAMPLE 3

To illustrate another embodiment of the present invention, an amount of methane was processed using the pressure swing reforming process illustrated in FIG. 3. In this example, the fuel cell is a proton conducting solid oxide fuel cell ("SOFC") operating at about 500° C. SOFC anode and cathode effluents (streams 318 & 312) are used as PSR regeneration feed (streams 329 & 330). Waste heat from the SOFC and the regeneration effluent (327) are used to make steam and provide preheat (not shown) of PSR and SOFC feeds, as needed. Water for steam is condensed from a cooled regeneration effluent (stream 327; cooling and condensation not shown). Key system parameters are identified in Table 3 below:

TABLE 3

| | Stream Identity | | | | | |
|---|---|---|---|---|---|---|
| | 301 + 303 Reform in | 305 Reform out | H2 Consumed In SOFC | 318/329 Anode Effluent | 312/330 Cathode Effluent | 327 Regen Effluent |
| Temp, C | 500 | 511 | | 500 | 500 | 459 |
| Pres. Atm* | 0.2 | 0.2 | | 0.1 | 0.1 | 0 |
| Gmols/min | | | | | | |
| CH4 | 4.12 | 0.12 | | 0.12 | | |
| H2O | 6.33 | 1.75 | | 0.74 | 13.57 | 14.55 |
| H2 | | 12.56 | 13.57 | | | |
| CO | | 3.50 | | 2.48 | | |
| CO2 | | 0.50 | | 1.52 | | 4.12 |
| N2 | | 0.07 | | 0.07 | 31.21 | 31.21 |
| O2 | | | | | 1.49 | |
| ΔHc, kW | 53.3 | 66.6 | 52.9 | 12.9 | | |

*pressure in gauge units (0 = atmospheric pressure)

This example makes use of two PSR reactors, operated as described with respect to FIG. 2 to provide a substantially continuous stream of product. The cycle time is 3 seconds, with regeneration and reforming each operating half the cycle. During the reforming step, the fuel flow is terminated about 0.02 sec before the steam, to allow remaining product to be flushed from the reactor into the product lines. The reactors are each 15 cm long by 5.6 cm in diameter. The recuperator (uncatalysed) section of the bed is 3.5 cm long. The packing is a 1200 channels/in$^2$ (186 channel/cm$^2$) honeycomb monolith design with 7 mil (0.18 mm) wall thickness, resulting in a bed void fraction of about 0.57, a bed wetted area of about 1260 ft$^{-1}$ (41 cm$^{-1}$), and a bulk bed heat capacity of about 0.22 cal/cm$^3$° C. The reforming $C_1$GHSV under these conditions is about 15,700 hr$^{-1}$, and the $\Delta T_{HT}$ is about 22° C., with a regen-step $h_v$ of about 0.41 cal/cm$^3$s° C.

What is claimed is:

1. A process for producing a fuel for a fuel cell comprising:
    (A) reforming a hydrocarbon containing feed with steam in a cyclic reforming and regeneration process comprising:
        i. introducing the feed and steam through a first zone of a reactor containing bed packing material and a reforming catalyst at a space velocity of at least 500 under reforming conditions;
        ii. passing at least a portion of the product of step i through a second zone of the reactor containing bed packing material and transferring heat from the product to the packing material;
        iii. removing substantially all the product from the second zone said product comprising a reform product enriched in hydrogen,
        iv. introducing an oxygen containing gas into the second zone and combusting the gas and a fuel in a region proximate to an interface between the first and second zone to produce heat and a combustion product and transferring heat of the combusting to the bed packing material of the first zone,
        v. removing substantially all of the combustion product from the first zone;

(B) Supplying said reform product from step iii to a fuel cell.

2. The process of claim 1 where:
(A) the feed and steam in step i is introduced through a first end of the first zone, and
(B) The product of step i is passed out a second end of the first zone and into a first end of a second zone, and
(C) the reform product is removed from a second end of the second zone, and
(D) the oxygen-containing gas is introduced through the second end of the second zone, and
(E) the combustion product is removed from the first end of the first zone.

3. The process of claim 2 wherein the heat of combustion is transferred by passing a gas through the second zone, from second end to first end and then through the first zone, from second end to first end.

4. The process of claim 2 wherein heat is transferred from the second zone to the first zone, after step iii but before step iv, by passing a gas through the second zone, from second end to first end and then through the first zone, from second end to first end.

5. The process of claim 1 wherein the reforming of steps i, ii, and iii is carried out at a higher pressure than regenerating the heat of said first zone of step iv.

6. The process of claim 1, wherein the cyclic process has a characteristic $\Delta T_{HT}$ ranging from about 0.1° C. to about 500° C.

7. The process of claim 1 wherein $\Delta T_{HT}$ ranges from about 0.5° C. to about 40° C.

8. The process of claim 1 wherein the space velocity ranges from about 1,000 to about 100,000 hr$^{-1}$.

9. The process of claim 1 wherein the space velocity ranges from about 2,000 to about 50,000 hr$^{-1}$.

10. The process of claim 1 wherein the reactor bed packing material has a volumetric heat transfer coefficient of greater than about 0.05 cal/cm$^3$s° C.

11. The process of claim 1 wherein the packing material is a honeycomb monolith having channel densities ranging from about 15 channels/cm$^2$ to about 500 channels/cm$^2$.

12. The process of claim 1 wherein the packing material provides a wetted area greater than about 6 cm$^2$/cm$^3$.

13. The process of claim 1, wherein the catalyst is selected from the group consisting of noble metal components, Group VIII metal components, Ag, Ce, Cu, La, Mo, Mg, Sn, Ti, Y, and Zn.

14. The process of claim 1, wherein the packing materials of said first zone or said second zone or both are composed of a material selected from stabilized or unstabilized magnesium aluminum silicates, aluminum silicate clays, mullite, alumina, silica-alumina, zirconia, and mixtures thereof.

15. The process of claim 1, wherein the hydrocarbon containing feed with steam has an inlet temperature ranging from about 20° C. to about 600° C.

16. The process of claim 1, wherein the reforming conditions comprises a reforming catalyst having at least a portion thereof heated to a temperature of about 700° C. to about 2000° C.

17. The process of claim 1, wherein said reform product from step iii is reacted over a water-gas shift catalyst to produce a synthesis gas having increased hydrogen concentration.

18. The process of claim 1 or claim 17 wherein said reform product or synthesis gas is supplied to a hydrogen separation means to produce a fuel cell feed gas having increased hydrogen concentration and a purge stream having depleted hydrogen concentration.

19. The process of claim 18 wherein said hydrogen separation means is selected from the group comprising: (i) a membrane separation means, (ii) pressure swing adsorption, and (iii) temperature swing adsorption.

20. The process of claim 19 wherein said hydrogen separation membrane means comprises at least one ceramic membrane, polymer membrane, carbon membrane, metallic membrane, composite membrane, or a combination thereof.

21. The process of claim 18 wherein the purge stream supplies at least a portion of the fuel of step iv.

22. The process of claim 1 wherein the feed, the steam, or both are heat exchanged with the reform product.

23. The process of claim 17, wherein the feed, the steam, or both are heat exchanged with the synthesis gas product of the water gas shift catalyst.

24. The process of claim 1 wherein a water recovery device is used to extract water from fuel cell cathode exhaust gas, said water being used to supply steam to the pressure swing reforming process.

25. The process of claim 1, wherein the oxygen containing gas is heat exchanged with the combustion product from step v.

26. The process of claim 1 wherein cathode exhaust gas from the fuel cell supplies at least a portion of the oxygen containing gas of step iv.

27. The process of claim 1 wherein at least a portion of the steam is generated using heat from the combustion of step iv.

28. The process of claim 27 wherein the combustion product is heat exchanged with water in a steam boiler to supply steam.

29. The process of claim 1 wherein at least a portion of the steam is created from water by direct injection of water into the packing material in the first zone of the reactor in step i.

30. The process of claims 1, 17 or 18 wherein heat from the reform product, the synthesis gas, the fuel cell feed gas, or a combination thereof is used to generate steam.

31. The process of claim 1, including:
measuring the temperature at or substantially at the interface between said first and second zones and, upon reaching a pre-determined first temperature, the oxygen-containing gas is introduced to said second zone; and
measuring the temperature at or substantially at the first end of said first zone and, upon reaching a pre-determined second temperature, the hydrocarbon, containing feed and steam feed is introduced to said first end of said first zone.

32. The process of claim 1, including:
measuring the temperature at or substantially at the interface between said first and second zones and, upon reaching a pre-determined temperature, the regeneration step (iv) is begun, and
measuring the temperature at or substantially at the first end of said first zone and, upon reaching a pre-determined second temperature, the reforming and recovery steps (i), (ii), and (iii) are begun.

33. The process of claim 1 wherein two or more reactors are operated simultaneously, such that steps i, ii, and iii are in progress on at least one reactor while steps iv, and v are in progress on at least one other reactor providing a substantially uninterrupted stream of reform product to the fuel cell.

* * * * *